(12) United States Patent
Chung et al.

(10) Patent No.: US 6,724,710 B2
(45) Date of Patent: Apr. 20, 2004

(54) SPHERICAL ABBERATION COMPENSATOR AND OPTICAL PICKUP USING THE SAME

(75) Inventors: Chong-sam Chung, Gyeonggi-do (KR); Young-man Ahn, Gyeonggi-do (KR); Tae-kyung Kim, Seoul (KR); Hea-jung Suh, Gyeonggi-do (KR); Jong-bae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/196,139

(22) Filed: Jul. 17, 2002

(65) Prior Publication Data

US 2003/0086353 A1 May 8, 2003

(30) Foreign Application Priority Data

Jul. 20, 2001 (KR) .................................. 10-2001-43785

(51) Int. Cl.[7] .................................................. G11B 7/00
(52) U.S. Cl. .................................................. 369/112.02
(58) Field of Search ........................ 369/112.02, 44.32, 369/112.01, 112.23, 112.05, 112.22

(56) References Cited

U.S. PATENT DOCUMENTS 5,513,158 A * 4/1996 Ohsato ........................ 369/112

FOREIGN PATENT DOCUMENTS

| JP | 2000-030281 | 1/2000 |
| JP | 2000-057616 | 2/2000 |
| KR | 1997-29430 | 6/1997 |
| KR | 2000-47946 | 7/2000 |

* cited by examiner

Primary Examiner—Nabil Hindi
(74) Attorney, Agent, or Firm—Staas & Halsey LLP

(57) ABSTRACT

A spherical aberration compensator for compensating for spherical aberration resulting from a thickness deviation of a recording medium. The spherical aberration compensator includes a central compensation which provides a phase distribution that is effective for compensating for spherical aberration resulting from the thickness deviation and a peripheral compensation portion which surrounds the central compensation portion and provides a phase distribution that is effective for reducing a worsening of the spherical aberration caused by axial displacement of an objective lens from the central compensation portion. The spherical aberration compensator effectively relieves an optical pickup having an objective lens of an NA of 0.7 or greater of worsening of the spherical aberration resulting from thickness deviation of the recording medium.

25 Claims, 6 Drawing Sheets

SPHERICAL ABBERATION COMPENSATOR AND OPTICAL PICKUP USING THE SAME

CROSS REFERENCE TO RELATED APPLICATIONS

This application claims the benefit of Korean Application No. 2001-43785 filed Jul. 20, 2001, in the Korean Intellectual Property Office, the disclosure of which is incorporated herein by reference.

BACKGROUND OF THE INVENTION

1. Field of the Invention

The present invention relates to a spherical aberration compensator which compensates for spherical aberration resulting from a thickness deviation of a recording medium and an optical pickup using the spherical aberration compensator.

2. Description of the Related Art

Recording/reproduction density of a recording medium increases as a size of a light spot focused on the recording medium by an optical pickup becomes smaller. The size of the light spot is proportional to a wavelength ($\lambda$) of light used by the optical pickup and is inversely proportional to the numerical aperture (NA) of an objective lens. Therefore, to implement a high-density recording medium, there is a need for an optical pickup with a short wavelength light source, such as a blue semiconductor laser, and an objective lens having a larger NA. Recently, there is an increasing interest in a format for increasing recording capacity up to 22.5 GB with a 0.85-NA objective lens and for reducing a thickness of a recording medium to 0.1 mm so as to prevent degradation of performance caused by tilting of the recording medium. Here, the thickness of the recording medium refers to a distance from a light receiving surface of the recording medium to an information recording surface.

As is apparent from equation (1) below, spherical aberration $W_{40d}$ is proportional to the fourth power of the NA of an objective lens, and to a deviation of the thickness of a recording medium $\Delta d$. For this reason, if an objective lens with an NA of about 0.85 is used, the recording medium must have a uniform thickness with a deviation less than ±3 $\mu$m. However, it is very difficult to manufacture the recording medium within the above thickness deviation range.

$$W_{40d} = \frac{n^2 - 1}{8n^3}(NA)^4 \Delta d \quad (1)$$

Figure 1:
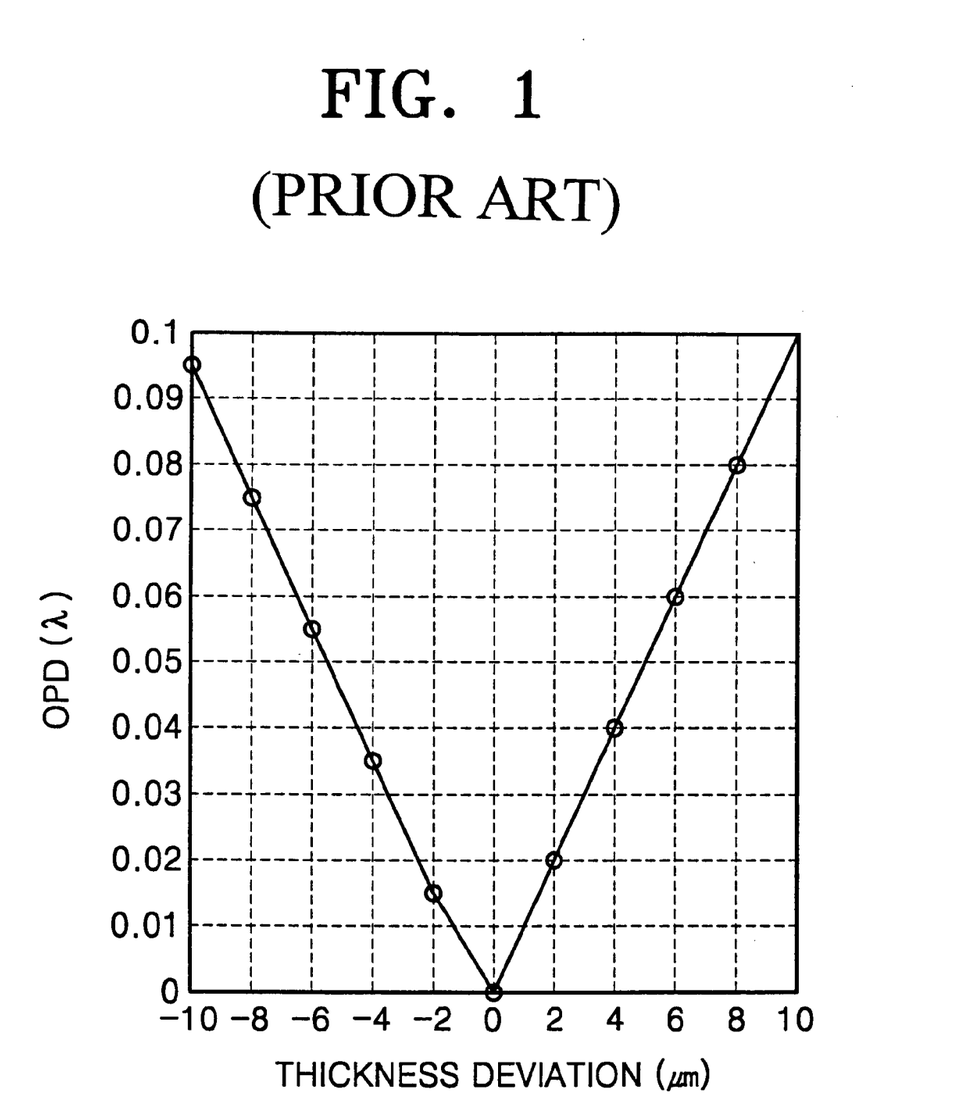
FIG. 1 is a graph showing optical phase distribution (OPD) with respect to thickness deviation of a recording medium.

FIG. 1 is a graph showing a relationship between the thickness deviation of a recording medium and wavefront aberration (optical phase difference (OPD)) caused by the thickness deviation where a 400-nm light source and an objective lens having an NA of 0.85 are used. As shown in FIG. 1, the wavefront aberration increases proportionally to the thickness deviation. Thus, if an objective lens having an NA as large as 0.85 is used, there is a need to compensate for the spherical aberration caused by the thickness deviation of the recording medium.

Japanese Patent Laid-open Publication No. 12-57616 discloses an optical pickup for detecting a thickness deviation of a recording medium. Japanese Patent Laid-open Publication No. 12-30281 describes a technique of compensating for wavefront aberration occurring where a recording medium is tilted with respect to the optical axis, using a liquid crystal compensator.

Figure 2:
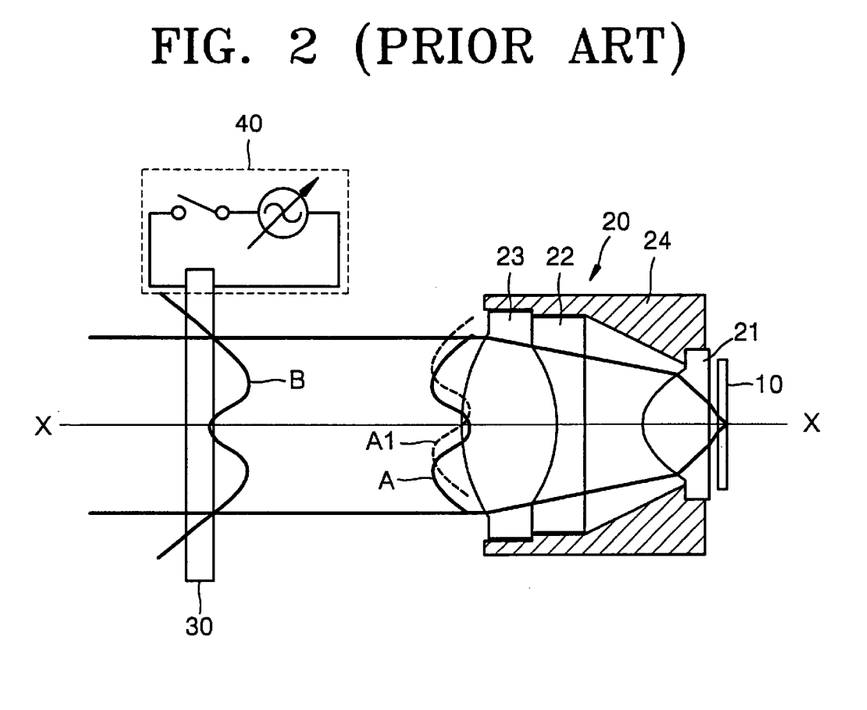
FIG. 2 shows an optical pickup with a conventional spherical aberration compensator.

FIG. 2 shows a principle of compensating for spherical aberration resulting from thickness deviation of a recording medium 10 in a conventional optical pickup. Referring to FIG. 2, an objective lens assembly 20 (hereinafter, simply "objective lens") is designed with a group of three lens elements 21, 22, and 23 for a larger NA. The three lens elements 21, 22, and 23 are accommodated in a single bobbin 24 and are aligned on the same optical axis X—X. A phase difference compensator 30 for compensating for spherical aberration is disposed on the optical axis X—X on a side of the objective lens 20 opposite the recording medium 10.

In FIG. 2, a curve A drawn near the objective lens 20 shows a wavefront due to spherical aberration resulting from manufacturing errors in the recording medium 10 and/or the lens elements 21, 22, and 23. This type of spherical aberration is referred to as "spherical aberration from an objective lens". A curve B drawn to overlap the phase difference corrector 30 shows the wavefront after spherical aberration compensation by the phase difference compensator 30. Another curve A1 drawn near the objective lens 20 shows the wavefront where the optical axis of the objective lens 20 is radially displaced (or shifted) from the optical axis of the phase difference compensator 30.

The phase difference compensator 30 generates an inverse spherical aberration that offsets spherical aberration from the objective lens due to manufacturing errors in the recording medium 10 and/or lens elements 21, 22, and 23. The phase difference compensator 30 uses a liquid crystal as a medium to adjust the degree of phase delay and differentially delays the phase of light by locally working the liquid crystal medium, to generate the inverse spherical aberration. Localized phase delay by the driving of liquid crystals is disclosed in Japanese Patent Laid-open Publication No. 12-30281 which is incorporated herein by reference.

The phase difference compensator 30 is operated by a separate driving circuit 40, and the driving circuit 40 operates according to a recording medium thickness variation signal, which is dynamically detected. The thickness deviation of the recording medium may be calculated from a focus error signal detected by an astigmatic lens disposed on an optical path. As an example, a technique disclosed in Japanese Laid-open Patent Publication No. 12-57616 may be applied to calculate the thickness deviation.

Figure 3:
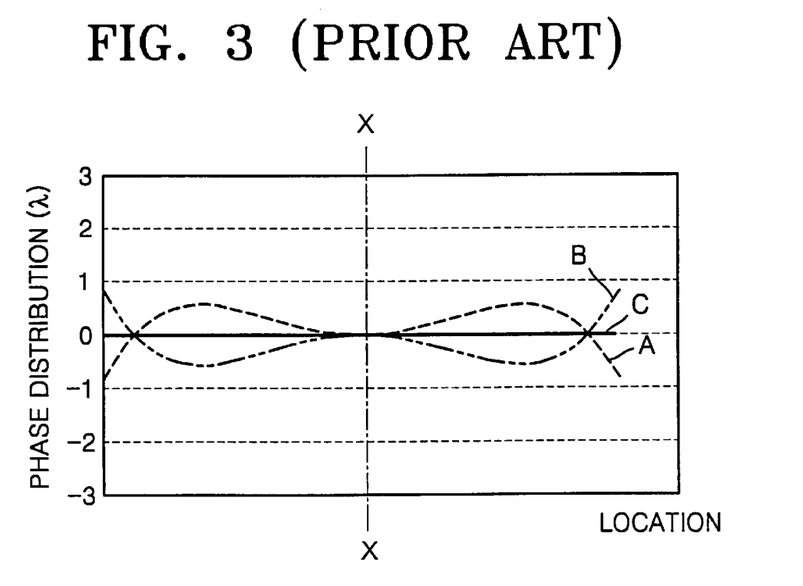
FIG. 3 is a graph of phase distribution illustrating a normal compensation of spherical aberration by the conventional spherical aberration compensator shown in FIG. 2.

FIG. 3 is a graph showing a relationship between spherical aberration from an objective lens and inverse spherical aberration offsetting the spherical aberration from the objective lens. FIG. 3 shows theoretical data for a case where the objective lens 20 and the phase difference compensator 30 are coaxially positioned. Accordingly, the aberration B produced by the phase difference compensator 30 has the same magnitude as the corresponding aberration A of the objective lens 20 but has an opposite sign. Therefore, the aberration of the objective lens 20 is completely offset by the inverse aberration of the phase difference compensator 30, thereby eliminating the spherical aberration, as indicated by C in FIG. 3.

Figure 4:
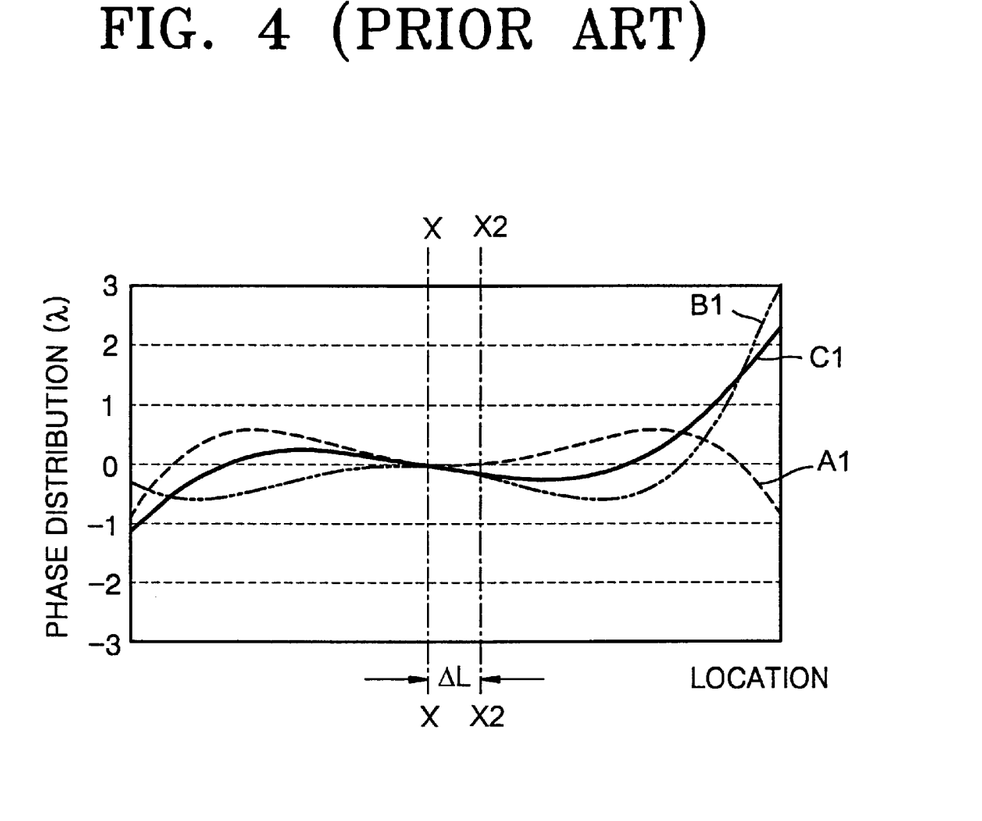
FIG. 4 is a graph of phase distribution illustrating an abnormal compensation of spherical aberration by the conventional spherical aberration compensator due to displacement of an objective lens axis from the spherical aberration compensator axis.

In an optical pickup, the relative position of the objective lens 20 with respect to the phase difference compensator 30 varies while the objective lens 20 is driven by an actuator (not shown) to trace a track of the recording medium 10. As a result of the relative displacement of the objective lens 20 from the phase difference compensator 30, wavefront mismatching occurs, as shown in FIG. 4. In particular, where an optical axis X2—X2 of the objective lens 20 is shifted from the optical axis X—X of the phase difference compensator 30 by a predetermined distance $\Delta L$, the aberration is abnormally compensated due to the wavefront matching and wavefront degradation results rather than aberration compensation. As shown in FIG. 4, as the optical axis X2—X2 of the objective lens 20 is separated from the optical axis X—X of the phase difference compensator 30, the spherical aberration is incompletely compensated as indicated by a sum of the curves A1 and B1 which yields the curve C1 as shown in FIG. 4, causing a more serious spherical aberration at the periphery of the objective lens 20. The curves A1 and B1 represent aberration of the objective lens 20 and inverse aberration produced by the phase difference compensator 30, respectively. The worsening of the spherical aberration due to the relative displacement between the optical axes of the objective lens and the phase difference compensator is a problem of conventional compensators designed to compensate only for thickness deviation of the recording medium, without considering a shifting of the objective lens.

SUMMARY OF THE INVENTION

To solve the above and other problems, it is an object of the present invention to provide a spherical aberration compensator which effectively compensates for spherical aberration caused by relative displacement between an optical axis of an objective lens and an optical axis of the spherical aberration compensator, and an optical pickup using the spherical aberration compensator.

Additional objects and advantages of the invention will be set forth in part in the description which follows, and, in part, will be obvious from the description, or may be learned by practice of the invention.

To achieve the above and other objects of the present invention, there is provided a spherical aberration compensator for compensating for spherical aberration occurring in an optical pickup, the spherical aberration compensator comprising: a central compensation portion coaxially disposed with an objective lens and which provides a phase distribution that is effective for compensating for spherical aberration resulting from thickness deviation of a recording medium; and a peripheral compensation portion which surrounds the central compensation portion and provides a phase distribution that is effective for reducing worsening of the spherical aberration caused by axial displacement of the objective lens from the central compensation portion.

To achieve the above and other objects of the present invention, there is also provided an optical pickup comprising: an objective lens disposed facing a recording medium; a light source which emits light onto the recording medium through the objective lens; and a spherical aberration compensator disposed between the light source and the objective lens, wherein the spherical aberration compensator comprises: a central compensation portion coaxially disposed with the objective lens and which provides a phase distribution that is effective for compensating for spherical aberration resulting from thickness deviation of a recording medium, and a peripheral compensation portion surrounding the central compensation portion and which provides a phase distribution that is effective for reducing worsening of the spherical aberration caused by axial displacement of the objective lens from the central compensation portion.

In the spherical aberration compensator and the optical pickup according to the present invention, the phase distribution of light transmitted through the peripheral compensation portion may be discontinuous from the phase distribution of light within the central compensation portion so that the central and peripheral compensation portions separately delay the phase of light in response to different compensation requirements.

The phase distribution of light transmitted through the peripheral compensation portion may be flat. In other words, an amount of phase delay by the peripheral compensation portion is equal throughout the peripheral compensation portion. Preferably an amount of phase delay introduced by the peripheral compensation portion is substantially coincident with an amount of phase delay introduced by the central compensation portion at the optical axis of the central compensating portion.

The spherical aberration compensator may comprise liquid crystals and a plurality of electrodes which locally drive the liquid crystals, to compensate for the spherical aberration by phase delay.

BRIEF DESCRIPTION OF THE DRAWINGS

The above and other objects and advantages of the present invention will become more apparent by describing in detail embodiments thereof with reference to the attached drawings in which.

DESCRIPTION OF THE PREFERRED EMBODIMENTS

Reference will now be made in detail to the present embodiments of the present invention, examples of which are illustrated in the accompanying drawings, wherein like reference numerals refer to like elements throughout. Embodiments of a spherical aberration compensator and an optical pickup using the same will be described and the description will focus of the spherical aberration compensator while other well-known constituent elements of the optical pickup will be referenced without full descriptions.

Figure 5A:
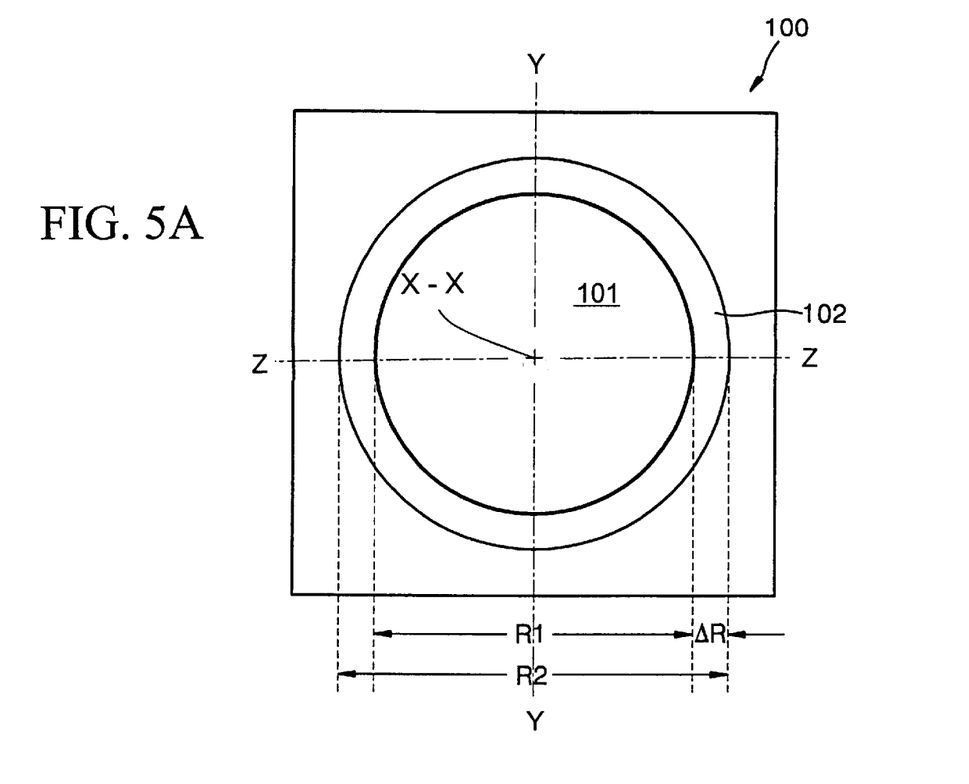
FIG. 5A shows a spherical aberration compensator according to the present invention.
Figure 5B:
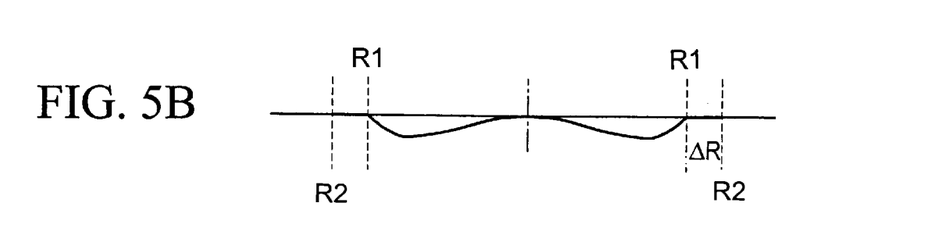
FIG. 5B shows a phase distribution along a cross section of the spherical aberration compensator shown in FIG. 5A.

FIG. 5A shows a plan view of a spherical aberration compensator 100 according to an embodiment of the present invention and FIG. 5B shows a phase distribution at different positions along a cross section of the spherical aberration compensator 100.

The spherical aberration compensator 100 comprises a central compensation portion 101 and a peripheral compensation portion 102 bounding the central compensation portion 101. The central compensation portion 101 and the peripheral compensation portion 102 are coaxially disposed on an optical axis X—X which is disposed orthogonal with respect to the axes Y—Y and Z—Z shown in FIG. 5A. The phase distribution of light transmitted through the central compensation portion 101 is symmetrical around the optical axis X—X and has peak values at portions surrounding the optical axis X—X. The phase distribution within the central compensation portion 101 is zero on the optical axis X—X. The phase distribution within the peripheral compensation portion 102 is discontinuous from the phase distribution of the central compensation portion 101 and is flat (region denoted by ΔR). In FIG. 5B the phase distribution is shown along an axis Z—Z which is orthogonal with respect to the axes X—X and Y—Y as an illustration, it being understood that the phase distribution also applies where the axis Y—Y and Z—Z are rotated around the axis X—X. The phase distributions of the peripheral compensation portion 102 (the region ΔR) and the central compensation portion 101 (the region with in R1) may coincide on the optical axis X—X. The phase distribution within the peripheral compensation portion 102 is not necessarily uniform (flat) across the peripheral compensation portion 102 and may increase or decrease depending on the displacement from the optical axis X—X. The phase distribution within the peripheral compensation portion 102 is dynamically controlled according to the displacement of the optical axis of an objective lens from the optical axis of the central compensation portion 101. The phase distribution within the central compensation portion 101 is dynamically controlled according to the thickness deviation of an optical medium.

A diameter R1 of the central compensation portion 101 may be equal to an effective diameter of an effective region of the objective lens of an optical pickup. A width ΔR of the peripheral compensation portion 102 may be determined to be equal to or larger than an allowable displacement of the optical axis of the objective lens, (i.e., an expected amount of shifting of the optical axis of the objective lens from the optical axis of the central compensation portion 101).

Figure 6:
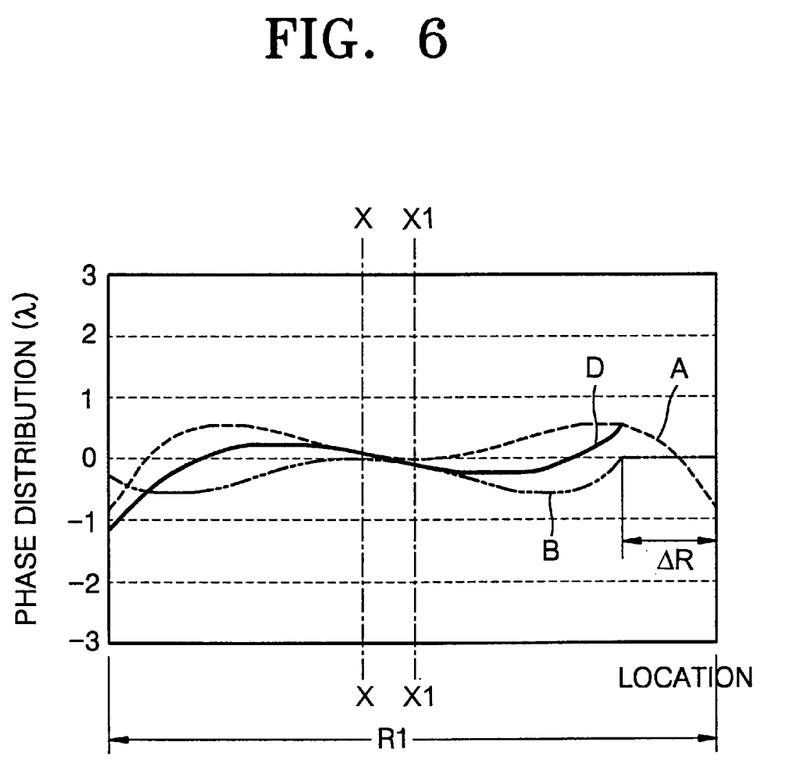
FIG. 6 is a graph of phase distribution illustrating effective spherical aberration compensation according to the present invention with respect to thickness deviation of a recording medium where the objective lens axis is displaced from the spherical aberration compensator axis.

FIG. 6 illustrates an example of phase compensation where an optical axis X1—X1 of an objective lens of an optical pickup is displaced from the optical axis X—X of the spherical aberration compensator 101 while the objective lens is driven within an effective diameter R1 by an actuator to trace a track of the recording medium. In FIG. 6, A denotes a phase distribution resulting from thickness deviation of the recording medium, B denotes a phase distribution within the spherical aberration compensator 101, and D denotes a phase distribution after the phase compensation.

As shown in FIG. 6, as the optical axis X1—X1 of the objective lens is displaced from the optical axis X—X of the spherical aberration compensator 100, a peripheral portion within the phase distribution having a step phase variation due to the thickness deviation of the recording medium overlaps the inverse phase distribution within the peripheral compensation portion 102 (denoted by ΔR), which is zero. As a result, there is no further phase variation within the peripheral phase distribution portion resulting from the thickness deviation of the recording medium.

Where the objective lens and the spherical aberration compensator 100 are coaxially positioned without relative displacement, phase variations do not occur to light being used in the optical pickup since the peripheral compensation portion 102 of the spherical aberration compensator 102 is basically designed to be beyond the effective region of the objective lens. The phase compensation (ultimately, spherical aberration compensation) by the spherical aberration compensator according to the present invention is distinguished from phase compensation by the conventional spherical aberration compensator described with reference to FIG. 4. Where the objective lens is shifted to a side, a steep phase variation at the periphery of the objective lens becomes worse with the conventional spherical aberration compensator, rather than being normally compensated. In contrast, the spherical aberration compensator according to the present invention solves this problem.

The spherical aberration compensator 100 according to the present invention is characterized by determining a size of the central compensation portion 101 to be the same as a size of the effective region of the objective lens, wherein the peripheral compensation portion 102 surrounds the central compensation portion 101 beyond the effective region of the objective lens, but is positionable within the effective region of the objective lens where the optical axis of the objective lens is relatively displaced from the optical axis of the spherical aberration compensator 100. According to the present invention, the phase compensation by the central compensation portion 101 is a function of the thickness deviation of the recording medium, and the phase compensation by the peripheral compensation portion 102 is a function of the displacement of the objective lens.

Although the phase distribution within the peripheral compensation portion 102 is shown as zero, the phase distribution within the peripheral compensation portion 102 is dynamically adjustable in such a way that the phase of light incident on the peripheral compensation portion 102 after displacement of the objective lens is compensated.

The spherical aberration compensator according to the present invention may use liquid crystals as a phase delay medium.

Figures 7, 7A:
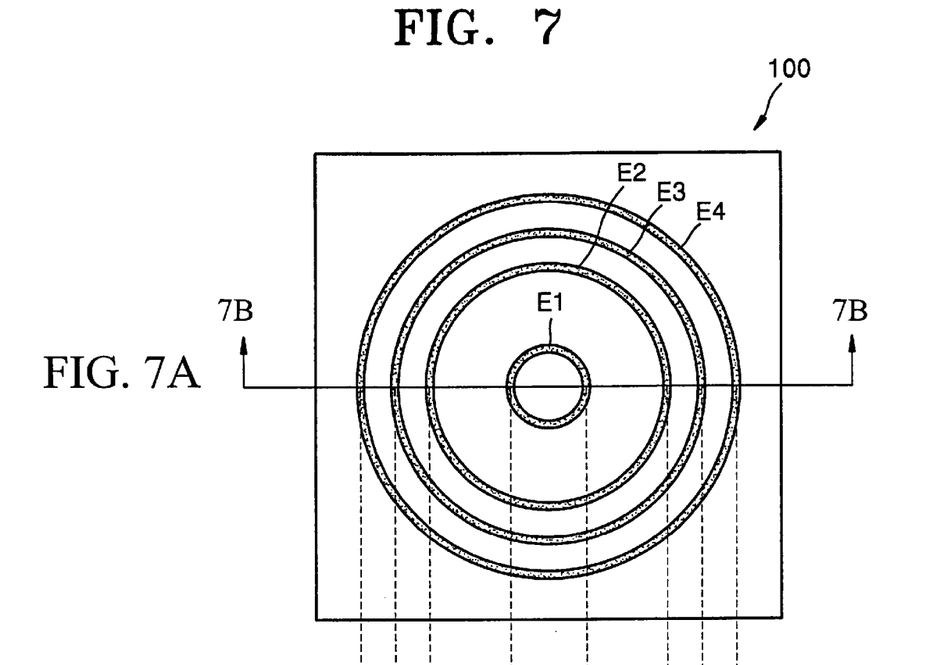
FIG. 7A is a plan view of a concentric arrangement of a number of electrodes in the spherical aberration compensator of the present invention.
Figure 7B:
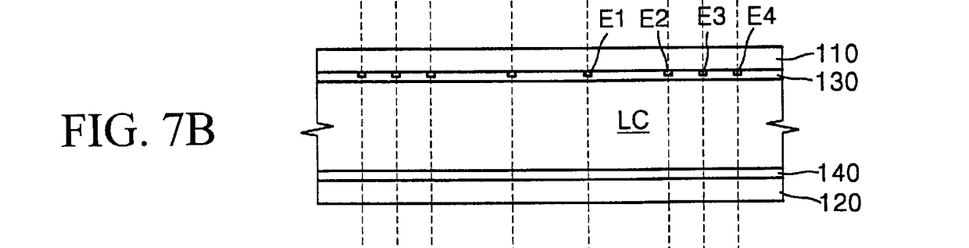
FIG. 7B is a sectional view of FIG. 7A.

Referring to FIGS. 7A and 7B, the spherical aberration compensator 100 according to the present invention comprises first and second substrates 110 and 120, which are transparent with respect to light, and liquid crystals LC disposed between the substrates 110 and 120. A plurality of annular electrodes E1, E2, E3, and E4 are concentrically arranged on the first substrate 110. A first electrode 130 is formed of, for example, indium tin oxide (ITO), to cover the annular electrodes E1, E2, E3, and E4. The annular electrodes E1, E2, E3, and E4 are formed of a metallic material having a low electrical resistance. The first electrode 130 has a relatively higher electrical resistance than the annular electrodes E1, E2, E3, and E4. A second or common electrode 140 is formed on the second substrate 120. If necessary, at least one separation layer, such as a dielectric layer or an orientation layer, which prevents contact between the first and second electrodes 130 and 140 and the liquid crystals LC, and required to drive the liquid crystals, may be interposed between the first substrate 110 and the second substrate 120. The deposition of such layers is widely applied in liquid crystal displays. The spherical aberration compensator according to the present invention is not limited by the application of the separation layer, the deposition technique of the separation layer, or the structure of the separation layer.

Figure 7C:
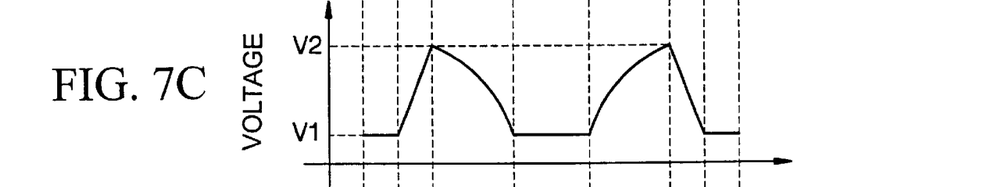
FIG. 7C shows a distribution of voltage applied to liquid crystals of the spherical aberration compensator by the electrodes shown in FIG. 7A.
Figure 7D:
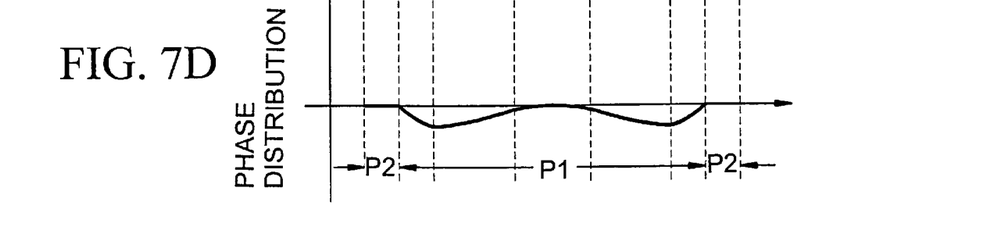
FIG. 7D shows the phase distribution within the spherical aberration compensator according to the voltage distribution shown in FIG. 7C.

A predetermined external voltage is applied to the first through fourth annular electrodes E1, E2, E3, and E4. The first annular electrode E1 is arranged closest to the optical axis X—X (Refer to FIG. 5A), and the second, third, and fourth annular electrodes E2, E3, and E4 sequentially surround the first annular electrode E1 with the fourth annular electrode E4 arranged outermost. The second or common electrode 140 is electrically grounded. A voltage V2 is applied to the second annular electrode E2, and lower voltages V1, which may be the same, are applied to the inner and outer annular electrodes, i.e, the first, third, and fourth electrodes E1, E3, and E4. By such an application of voltages, the voltage of the first electrode 130 electrically connected to the first through fourth annular electrodes E1, E2, E3, and E4 drops, resulting in a voltage distribution as shown in FIG. 7C. In particular, FIG. 7C shows the voltage distribution within the liquid crystals when an equal voltage is applied to the first, third, and fourth annular electrodes E1, E3, and E4. FIG. 7D shows the phase distribution (for spherical aberration compensation) within the liquid crystals having the voltage distribution as shown in FIG. 7C. As is apparent from FIG. 7D, the phase distribution beyond the effective region of the objective lens is constant at zero. In FIG. 7D, the region indicated as P1 corresponds to the phase distribution in the central compensation portion 101 and the regions indicated by P2 correspond to the phase distribution in the peripheral compensation portion 102. Further, as can be seen in FIG. 7D, an amount of phase delay by the peripheral compensation portion is substantially equal with an amount of phase delay of the central compensation portion at the optical axis X—X.

The first, second, and third annular electrodes E1, E2, and E3 control the central compensation portion 101 of the spherical aberration compensator 100 according to the present invention, and the third and fourth annular electrodes E3 and E4 control the peripheral compensation portion 102.

While the phase distribution within the peripheral compensation portion 102 is described to be zero in the example shown in FIGS. 7C and 7D, the phase distribution within the peripheral compensation portion 102 is dynamically adjustable in such a way that the phase of light incident on the peripheral compensation portion 102 due to axial displacement of the objective lens is compensated. In this case, the index of refraction of the liquid crystals within the peripheral compensation portion 102 may be dynamically controlled by a voltage difference between the third and fourth annular electrodes E3 and E4. An amount by which the peripheral compensation portion 102 changes the phase of light transmitted through the peripheral compensation portion 102 may be adjusted to be coincident with that at the core (the portion near the X—X axis) of the central compensation portion 101 of the spherical aberration compensator 100.

It is appreciated that the spherical aberration compensator according to the present invention described invention is applicable to optical pickups, and in particular, for so-called "high definition-digital versatile disc (HD-DVD)" apparatuses having an NA of 0.85.

To determine characteristics of a spherical aberration compensator according to the present invention, jitter was calculated using the scalar diffraction theory under the conditions shown in Table 1. The jitter calculation with respect to amounts of radial displacement of the objective lens was performed for a conventional spherical aberration compensator and for the spherical aberration compensator having the structure of FIG. 5 according to the present invention. The results are shown in Table 2.

TABLE 1

| | |
|---|---|
| Wavelength of light source ($\gamma$, nm) | 400 |
| RIM-intensity (in tangential/radial direction) | 0.92/0.60 |
| NA of objective lens | 0.85 |
| Focal length of objective lens (mm) | 1.760 |

TABLE 1-continued

| | |
|---|---|
| Effective diameter of incident light (mm) | 5 |
| Groove width of recording medium ($\mu$m) | 0.30 |
| Minimum mark length of recording medium ($\mu$m) | 0.185 |
| Groove depth of recording medium ($\mu$m) | $-\lambda/6$ |
| Modulation scheme | EFM+ |

TABLE 2

| Displacement ($\mu$m) | 0 | 50 | 100 | 150 | 200 | 250 | 300 | 350 |
|---|---|---|---|---|---|---|---|---|
| Jitter (%) (Present invention) | 5.28 | 5.54 | 5.90 | 6.71 | 8.09 | 9.94 | 12.46 | 15.67 |
| Jitter (%) (Prior Art) | 5.28 | 5.40 | 5.82 | 7.07 | 9.48 | 13.07 | 17.28 | >20 |

As shown in Table 2, where the displacement (shifting) of the optical axis of the objective lens from the optical axis of the spherical aberration compensator is small, in particular, 50 $\mu$m and 100 $\mu$m, jitter was 5.54% and 5.90%, respectively, for the spherical aberration compensator according to the present invention. The jitter values at 50 $\mu$m and 100 $\mu$m for the spherical aberration compensator of the present invention are slightly higher than the jitter values for the conventional spherical aberration compensator, but the corresponding values of 5.54% and 5.90% are not considered significant in optical pickups. The effect of jitter reduction by the spherical aberration compensator according to the present invention becomes apparent at a displacement larger than 150 $\mu$m and becomes more apparent with increasing displacement of the objective lens with respect to the spherical aberration compensator as shown in Table 2.

The improved jitter reduction effect in the present invention is due to the spherical aberration compensator 100 acting as a phase changer, reducing the worsening of spherical aberration caused by the axial displacement of the objective lens from the spherical aberration compensator 100, and correcting the spherical aberration resulting from thickness deviation of a recording medium in an optical pickup where the objective lens has an NA of 0.7 or greater.

While conventional spherical aberration compensators are constructed only in consideration of thickness variation of a recording medium and have worsened spherical aberration resulting from the thickness deviation of the recording medium where an objective lens is axially displaced from the compensator, the spherical aberration compensator of the present invention is free from the problem of the worsening of the spherical aberration caused by the axial displacement of the objective lens.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A spherical aberration compensator for compensating for spherical aberration occurring in an optical pickup having an objective lens operative to focus light transmitted from a light source onto a recording medium along a first optical axis, the spherical aberration compensator comprising:

a central compensation portion having a second optical axis and which provides a first phase distribution which compensates for spherical aberration of the transmitted light resulting from a thickness deviation of the recording medium; and a peripheral compensation portion which surrounds the central compensation portion and provides a second phase distribution which reduces the spherical aberration of the transmitted light caused by axial displacement of the first and second optical axes.

2. The spherical aberration compensator of claim 1, wherein the first and second phase distributions are dynamically controlled according to the thickness deviation of the recording medium.

3. The spherical aberration compensator of claim 1, wherein the second phase distribution is discontinuous from the first phase distribution.

4. The spherical aberration compensator of claim 1, wherein the second phase distribution is flat.

5. The spherical aberration compensator of claim 1, wherein an amount of phase delay by the peripheral compensation portion is substantially equal with an amount of phase delay of the central compensation portion at the second optical axis.

6. The spherical aberration compensator claim 2, wherein an amount of phase delay by the peripheral compensation portion is substantially equal with an amount of phase delay of the central compensation portion at the second optical axis.

7. The spherical aberration compensator claim 3, wherein an amount of phase delay by the peripheral compensation portion is substantially equal with an amount of phase delay of the central compensation portion at the second optical axis.

8. The spherical aberration compensator claim 4, wherein an amount of phase delay by the peripheral compensation portion is substantially coincident with an amount of phase delay of the central compensation portion at the second optical axis.

9. The spherical aberration compensator of claim 1, further comprising liquid crystals and a plurality of electrodes which locally drive the liquid crystals, to compensate for the spherical aberration by phase delay.

10. The spherical aberration compensator of claim 2, further comprising liquid crystals and a plurality of electrodes which locally drive the liquid crystals, to compensate for the spherical aberration by phase delay.

11. The spherical aberration compensator of claim 3, further comprising liquid crystals and a plurality of electrodes which locally drive the liquid crystals, to compensate for the spherical aberration by phase delay.

12. The spherical aberration compensator of claim 4, further comprising liquid crystals and a plurality of electrodes which locally drive the liquid crystals, to compensate for the spherical aberration by phase delay.

13. An optical pickup comprising:
an objective lens disposed facing a recording medium;
a light source which emits light onto the recording medium through the objective lens; and
a spherical aberration compensator between the light source and the objective lens, the spherical aberration compensator comprising:
a central compensation portion which provides a phase distribution which compensates for spherical aberration resulting from a thickness deviation of the recording medium; and
a peripheral compensation portion which surrounds the central compensation portion and which provides a phase distribution which reduces spherical aberration caused by axial displacement of the objective lens from the central compensation portion.

14. The optical pickup of claim 13, wherein the central compensation portion and the peripheral compensation portion are dynamically controlled according to the thickness deviation of the recording medium.

15. The optical pickup of claim 13, wherein the phase distribution of light transmitted through the peripheral compensation portion is discontinuous from the phase distribution within the central compensation portion.

16. The optical pickup of claim 13, wherein the phase distribution of light transmitted through the peripheral compensation portion is flat.

17. The optical pickup of claim 13, wherein an amount of phase delay by the peripheral compensation portion is substantially equal with an amount of phase delay of a core portion of the central compensation portion.

18. The optical pickup of claim 14, wherein an amount of phase delay by the peripheral compensation portion is substantially equal with an amount of phase delay of a core portion of the central compensation portion.

19. The optical pickup of claim 15, wherein an amount of phase delay by the peripheral compensation portion is substantially equal with an amount of phase delay of a core portion of the central compensation portion.

20. The optical pickup of claim 16, wherein an amount of phase delay by the peripheral compensation portion is substantially equal with an amount of phase delay a core portion of the central compensation portion.

21. The optical pickup of claim 13, wherein the spherical aberration compensator further comprises liquid crystals and a plurality of electrodes which locally drive the liquid crystals, to compensate for the spherical aberration by phase delay.

22. The optical pickup of claim 14, wherein the spherical aberration compensator further comprises liquid crystals and a plurality of electrodes which locally drive the liquid crystals, to compensate for the spherical aberration by phase delay.

23. The optical pickup of claim 15, wherein the spherical aberration compensator further comprises liquid crystals and a plurality of electrodes which locally drive the liquid crystals, to compensate for the spherical aberration by phase delay.

24. The optical pickup of claim 16, wherein the spherical aberration compensator further comprises liquid crystals and a plurality of electrodes which locally drive the liquid crystals, to compensate for the spherical aberration by phase delay.

25. A method of compensating for spherical aberration of a light in an optical pickup having at least a light source and an objective lens, the method comprising:
providing a liquid crystal compensator having a plurality of concentrically arranged electrodes, the liquid crystal compensator arranged transverse to an optical axis of the objective lens,
applying a first voltage to at least one of the plurality of electrodes based on sensing a thickness deviation of a recording medium;
applying a second voltage to at least another one of the plurality of electrodes based on sensing a deviation of an optical axis of the liquid crystal compensator from an optical axis of the objective lens.

* * * * *